J. W. MASTER.
UNDERCURRENT SEA MOTOR.
APPLICATION FILED JUNE 16, 1911.
1,015,627.
Patented Jan. 23, 1912.
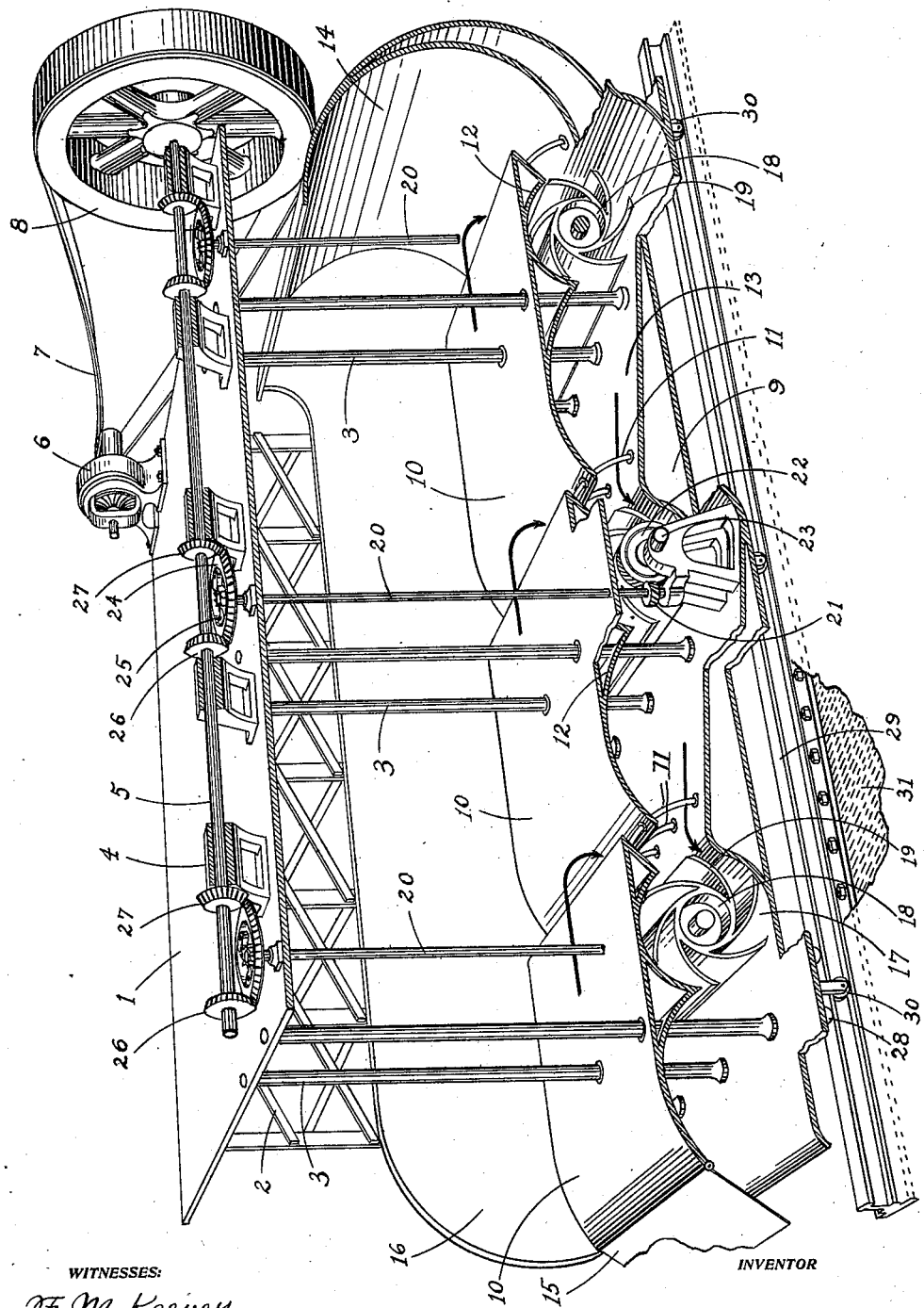
WITNESSES:
F. M. Keeney.
O. Knudson
INVENTOR
James W. Master

UNITED STATES PATENT OFFICE.

JAMES W. MASTER, OF SAN DIEGO, CALIFORNIA, ASSIGNOR OF ONE-THIRD TO SOLON BRYAN, OF SAN DIEGO, CALIFORNIA.

UNDERCURRENT SEA-MOTOR.

1,015,627.        Specification of Letters Patent.        Patented Jan. 23, 1912.

Application filed June 16, 1911. Serial No. 633,541.

*To all whom it may concern:*

Be it known that I, JAMES W. MASTER, a citizen of the United States, residing at San Diego, in the county of San Diego and State of California, have invented an Improvement in Undercurrent Sea-Motors, of which the following is a full, clear, and exact description.

This invention has relation to undercurrent sea motors, its purposes being the provision of novel and efficient mechanism having the several features and advantages herein specified, for transforming and utilizing the power of the undercurrents of the sea, created by the waves and surf, in the generation of power. In attaining these objects, the invention is more particularly directed to that class of sea motors in which a plurality or battery of turbine wheels are employed to actuate a single power shaft, the invention comprising an upper and a lower inclined platform with turbine wheels rotatably mounted therebetween, means for directing to and confining the waves and surf upon the upper platform, means for directing the same upon the wheel blades, and vertical shafts suitably arranged with gear-wheels, to transmit the motion of the turbine wheels to the power shaft, my invention comprising the combination and arrangement of parts, substantially as herein described and claimed, and of which a convenient embodiment is shown in the accompanying drawings.

While simple and efficient means are herein provided for accomplishing the objects of the invention, and the elements shown and described are well adapted to serve the purposes for which they are intended, it is to be understood that no limitations are made to the precise structural details herein exhibited, but that changes, alterations, and modifications, which are within the spirit and scope of the invention, may be made, the essence of my invention comprising the means for confining and directing the waves and surf to the upper end of two inclined platforms, and the utilization thereof to actuate turbine wheels rotatably mounted between the two platforms.

Of the drawing, disclosing in perspective the disposition of parts, platform 1, supported by side-frames 2 and a series of uprights 3 between the sides, is provided with bearing standards 4, carrying power shaft 5, and has thereon electric generator 6, driven by belt 7 passing over a heavy driving wheel 8, which maintains a uniform and continuous motion of the power shaft.

For controlling the sea current, hereinafter referred to as the operating or flowing medium, lower confining wall 9, inclined relatively to the sea-level, and superposed wall 10, parallel with wall 9, having a series of casings 12 supported by uprights 3 and braces 11, and lower wall 9 having a series of supplementary platforms 13 comprising sections of lesser inclination, form a series of successive chambers so arranged as to direct the flow of a medium from the lower part of one chamber to the upper part of the next successive chamber and against working members therein above the horizontal plane of their axial centers. Confining walls 9 and 10 are inclined relatively to the sea level with rear ends uppermost, rear end 14, of wall 9, extending in an upward curve to cause the return flow of the operating medium between said walls. Swinging flap 15 allows the egress of the flowing medium and prevents a return flow thereof. Wall 10 is arranged in spaced sections supported by retaining side walls 16 which direct the flow of the medium thereon, said sections with platforms 13, forming chambers 17, within which working members 18 are rotatably mounted, said working members having curved blades 19, formed integrally and adapted to receive the impact of the flowing medium which passes consecutively from one chamber to another, the direction of flow being from the rear and upper end of wall 9, through the successive chambers to the point of egress.

Means for transmitting motion from the working members to the power shaft, are provided, comprising vertical shafts 20, having gears 21, in mesh with gears 22, on shafts 23 of the working members, and gears 24, independently revoluble upon the vertical shafts and driven by ratchet mechanism 25, gears 24 being in mesh with fixed gears 26, on the power shaft, and idler gears 27, which are independently revoluble upon the power shaft. Shafts 20, operated by the working members, are independently revoluble relatively to the power shaft, the ratchet mechanism 25, being inoperative to drive gears 24 which rotate in unison with the power shaft, during the slower or intermittent motion of shafts 20, the arrangement comprising means for rendering the working members relatively inoperative to the power shaft and generating appliances affected thereby, during the slower or minimum movement of the working members.

The device is preferably made of sheet-metal and is provided with wheels 28, which engage with track-rails 29, of which there may be a suitable number. Wheels 30 engage with the underside of the flange on each side of rails 29, and assist in retaining the device upon the track. Wheels 28 and 30 are rotatably secured underneath wall 9 and retaining walls 16, and thus support the device in position and retain the same upon the track rails, of which one rail is shown in the drawing. Each rail is secured to concrete flooring 31, which is of sufficient area to cover the location of the device. The track extends upon the shore, and the motor may thus be drawn out of the water, if so desired for facilitating repairing and the like. The motor is to be blocked against a backward and forward movement, after it is placed in position, by means not shown in the drawing. Various means may be employed for thus blocking, anchoring, and securing the motor in position.

In use this device is to be placed near the shore and submerged to a depth sufficient to obtain the best results. The working members which are rotatable turbine wheels having blades of sufficient amplitude to successfully utilize the full volume of the flowing medium, may consist of as many as can be operated in the distance traversed by the undercurrent at the shore. The superposed and inclined wall, in addition to increasing the power of the undercurrent, also protects the same from counter-currents on the surface of the sea, and forces the advancing seas to form breakers which roll upward and to the rear of the device, a vast volume of water being thus made to flow in a return direction and between the inclined walls, comprising, in a constant and nearly uniform manner, an actuating medium for the working members, the powerful and continuous undercurrent of the sea being thus utilized in the development of power.

While the current is continuous and uniform, compared with other movements of the sea, means are provided for rendering the working members and transmitting shafts relatively inoperative to the power generating appliances during the slower and intermittent movement of the working members. Should the opening at the rear be insufficient to admit all of the seas to the passage between the inclined walls, spaces are provided between adjacent sections of the superposed wall to receive the remaining portion of the receding seas and breakers.

It will be seen that I have provided a device of simple design that may be easily and cheaply constructed for the purpose, and that may consist of a single unit, or a number of such units connected and arranged in a suitable manner for the development of power.

The arrangement of the mechanism does not interfere with the movement of the seas to the rear of the motor, and they are thus free to run high and fill the space at the rear formed by the retaining side walls and curved end wall, which acts as a reservoir to retain the accumulated water until all is finally delivered through the passages and chambers between the inclined walls. The weight of many tons of water may thus be utilized to increase the pressure or head of the undercurrent and increase the velocity thereof, and more efficiently operate the moving parts of the device, and the distribution of the water as an actuating medium is more evenly effected for the development of power.

I claim as my invention:

1. In an undercurrent sea motor, the combination with two inclined walls, one of which is superposed above the other, of retaining side walls to direct the flow of a medium upon the superposed wall, an upwardly-extending curved end integral with the lower inclined wall to cause the return flow of the medium between the inclined walls, and rotatably-mounted members between the inclined walls arranged to be operated by the flow of the medium, substantially as set forth.

2. In an undercurrent sea motor, the combination with an inclined wall and a superposed similarly inclined wall having a series of chambers formed between said walls, of a rotatably-mounted member in each chamber, and a series of curved blades integral with each of said rotatable members, having their extended edges in close proximity to the said inclined walls to receive the flow of the medium, substantially as set forth.

3. In an undercurrent sea motor, the combination with two inclined walls one of which is superposed above the other, of rotatable members mounted between said inclined walls, of curved casing beneath the superposed wall in close proximity to the rotatable members, and supplementary platforms upon the lower inclined wall having a lesser angle of inclination for directing the flow of a medium upon said rotatable members above the horizontal plane of their axes, substantially as set forth.

4. In an undercurrent sea motor, the combination with a lower inclined wall having a series of supplementary platforms of lesser inclination, of a sectional and superposed inclined wall, a curved casing on the underside of each section forming with the lower inclined wall a series of chambers, a rotatable member in each chamber, and a series of uprights and braces supporting the superposed sections in an approximately parallel position with the lower inclined wall and with a space between adjacent sections, to direct the flow of a medium upon said rotatable members, substantially as set forth.

5. In an undercurrent sea motor, the combination with inclined walls forming a series of chambers arranged to extend transversely of the plane of inclination and with communicating passages between consecutive chambers, of confining side walls and an upwardly curved end wall to direct the flow of a medium upon and between the inclined walls, and a rotatable member in each chamber, the chambers being arranged to utilize the flow of the medium from each chamber to actuate the rotatable member in the next successive and lower chamber, substantially as set forth.

6. In an undercurrent sea-motor, the combination with confining walls having a series of chambers formed therein, of a series of rotatable members, one mounted in each of said chambers with its axis in a horizontal position, and actuated by a flowing medium, vertical shafts rotatably mounted and actuated by said members in said chambers, and a rotatably-mounted power shaft actuated by said vertical shafts, the power shaft being transversely positioned with the rotatable members actuated by the flow of a medium, substantially as set forth.

7. In an undercurrent sea motor, the combination with inclined and side retaining walls having a series of chambers formed between the inclined walls, of rotatable members mounted on horizontal shafts within said chambers, a gear wheel mounted on said horizontal shafts, vertical rotatable shafts, pinions thereon meshing with the gear wheels, and a power shaft rotatably mounted in a horizontal position and adapted to be actuated by the vertical shafts, upon the flow of a medium against the rotatable members in said chambers, substantially as set forth.

8. In an undercurrent sea motor, the combination with rotatable members actuated by a flowing medium, of vertical shafts operated by said rotatable members, a power shaft at the upper ends of said vertical shafts rotatably mounted, a large gear wheel at said upper ends of the vertical shafts revolving on a dissident axis, a ratchet mechanism to actuate the gear in unison with its shaft, and pinions on the power shaft meshing with the gear wheel, one being fixed thereon, the other being an idler pinion revolving in an independent and opposite circuit, substantially as set forth.

9. In an undercurrent sea motor, the combination with a series of working members actuated by a flowing medium, of walls directing the flowing medium against the working members, a platform, a frame and series of uprights supporting the platform, extending from said walls, power generating means on the platform, comprising a power shaft, a large balance wheel thereon, and means for transmitting motion from the working members to the power shaft, substantially as set forth.

10. In an undercurrent sea motor, the combination with confining walls having a plurality of chambers, of working members in said chambers, a platform, a frame and uprights extending from the confining walls and supporting the platform, generating appliances mounted on the platform, a balance wheel for maintaining a uniform and continuous movement to the generating appliances, means for transmitting motion from the working members to the generating appliances, and means for rendering the transmitting means relatively inoperative to the generating appliances during the slower or intermittent movement of the working members, substantially as set forth.

11. In an undercurrent sea motor, the combination with working members actuated by a flowing medium, of an inclined lower wall, stepped sections to direct the flowing medium upon the working members, a superposed sectional wall to correspond with the lower wall and parallel therewith, the confining walls inclined with the rear end uppermost, retaining side walls to direct the flowing medium upon the superposed wall and to the rear thereof, an upwardly curved extension on the lower wall at the rear end, to cause the return flow of the medium between said inclined walls, and a swinging flap at the front end of the superposed wall, arranged to allow the egress of the flowing medium and prevent a return motion of the same, substantially as set forth.

12. In an undercurrent sea motor, the combination with power generating appliances and working members having means for operating the generating appliances, of an inclined wall, a superposed wall parallel with the inclined wall, high retaining side walls and an end wall curved upward and extending from the lower inclined wall and arranged to form with said side walls a reservoir at the rear and secure a more uniform distribution and complete utilization of a flowing medium to and by said working members between said inclined walls, substantially as set forth.

13. In an undercurrent sea motor, a platform, generating appliances thereon, working members operating the generating appliances parallel and inclined walls confining the current to the working members, and side and end retaining walls which form a reservoir at the upper and rear end of the inclined walls, whereby a flowing medium is retained until delivered to the working members between said inclined walls, substantially as set forth.

14. In an undercurrent sea motor, power generating appliances, working members actuated by a flowing medium, means for transmitting motion from the working members to the power generating appliances, confining walls directing the flowing medium to the working members, and means attached to the confining walls to hold the contained operating mechanism in an operative position relative to the flowing medium, comprising bearing wheels supporting the device upon a flanged multiple-railed track, and retaining wheels arranged to bear on the underside of the flanges on each rail, substantially as set forth.

15. In a device as described a multiple-railed and flanged track, concrete foundations supporting the rails, a frame and retaining walls supporting power generating mechanism therein, and means for retaining the said power generating mechanism in an operative position relatively to a flowing medium, comprising bearing and retaining wheels which engage with said track, rotatively secured to the bottom of the confining and retaining walls, substantially as set forth.

In testimony whereof, I affix my signature, in presence of two witnesses.

JAMES W. MASTER.

Witnesses:
F. M. KEENEY,
W. A. SHEA.

Copies of this patent may be obtained for five cents each, by addressing the "Commissioner of Patents. Washington, D. C."